US012640121B2

(12) United States Patent
Perry

(10) Patent No.: US 12,640,121 B2
(45) Date of Patent: May 26, 2026

(54) STRING DEFLECTOR FOR GUITAR

(71) Applicant: Micheal Shane Perry, Mooresville, NC (US)

(72) Inventor: Micheal Shane Perry, Mooresville, NC (US)

( * ) Notice: Subject to any disclaimer, the term of this patent is extended or adjusted under 35 U.S.C. 154(b) by 8 days.

(21) Appl. No.: 17/969,395

(22) Filed: Oct. 19, 2022

(65) Prior Publication Data

US 2024/0135902 A1 Apr. 25, 2024
US 2024/0233688 A9 Jul. 11, 2024

(51) Int. Cl.
*G10D 3/12* (2020.01)
*G10D 1/08* (2006.01)

(52) U.S. Cl.
CPC ................. *G10D 3/12* (2013.01); *G10D 1/08* (2013.01)

(58) Field of Classification Search
CPC ................................... G10D 3/12; G10D 1/08
See application file for complete search history.

(56) References Cited

U.S. PATENT DOCUMENTS 4,517,874 A * 5/1985 Fender ..................... G10D 3/12 84/214
5,932,822 A * 8/1999 Bernstein ................. G10D 3/12 84/314 N
6,130,373 A * 10/2000 Hall ........................ G10D 3/153 84/312 R
7,332,662 B2 * 2/2008 Kandrack .............. G10D 1/085 84/293
9,489,929 B1 * 11/2016 Armstrong ............... G10D 3/12
10,255,893 B1 * 4/2019 Clark ........................ G10D 1/08
11,164,549 B1 * 11/2021 Baird ........................ G10D 3/12
2007/0272069 A1 * 11/2007 Lee ........................ G10D 3/046 84/293
2015/0310837 A1 * 10/2015 Garrick .................... G10D 3/04 84/297 R
2024/0135902 A1 * 4/2024 Perry ....................... G10D 1/08

* cited by examiner

*Primary Examiner* — Robert W Horn

(57) ABSTRACT

A device is provided that changes the break angle of the guitar string between the top nut and the tuning machines, so as to relieve the angle of the string after the top not and the tension on the string at the top nut. The device is hidden beneath the truss rod cover on the headstock of the guitar and the strings travel through the device. The device does not obfuscate artwork on the headstock such that there is minimal change to the appearance. The device uses the original holes in the headstock and is configured to receive screws to secure the truss rod cover without altering or damaging the guitar. The device does not require the removal of any original guitar parts other than the truss rod cover, which is re-secured onto the device after the device is secured to the headstock.

20 Claims, 10 Drawing Sheets

STRING DEFLECTOR FOR GUITAR

TECHNOLOGICAL FIELD

Embodiments of the present invention relate generally to accessories for guitars and other string instruments for enhancing performance of the instrument and maintaining proper tuning.

BACKGROUND

On almost all guitars, the string runs from the bridge (typically close to where the string is fastened to the body of the guitar) along the neck and across a piece of material called the "top nut" and then across the headstock to be fastened to the spindles of the tuning devices, called "tuning machines." The top nut is often made of bone, plastic, wood, or other materials that can be adjusted so that the instrument functions properly.

On many popular guitars, because of the angle of the headstock and the space between the center of the headstock and the tuning mechanisms, the string becomes bound up in the slot at the top nut, which causes tuning problems. This is typical of guitars wherein the headstock is attached at a radical angle, the tuning mechanisms are placed on either side of the headstock (as opposed to all along one side) and the headstock is wide, thereby separating the tuning machines.

Accordingly, there is a need for a way to keep guitar strings in tune for longer periods of time.

BRIEF SUMMARY

Through applied ingenuity, the inventor has developed a device that is designed to realign guitar strings so as to stop the unwanted binding at the top nut without obfuscating the original artwork of the guitar and without altering or damaging the guitar to which it is attached.

In particular, embodiments of a device for relieving the break angle on guitar strings are described herein, wherein the device comprises a body defining a first channel and a second channel. The first channel is configured to receive a first string of the guitar and extends between a first inlet opening and a first outlet port. The second channel is configured to receive a second string of the guitar and extends between a second inlet opening and a second outlet port. A transition nut is disposed proximate the first and second outlet ports. The transition nut is substantially perpendicular to a longitudinal axis of the body and defines a first through hole configured to receive the first string and a second through hole configured to receive the second string. In an operational configuration in which the device is secured to the headstock of the guitar and the first string and the second string are received by the device, an angle of each of the first string and the second string is gradually adjusted between the neck of the guitar and a respective tuning peg.

In some embodiments, the body further defines a first outer slot configured to receive a third string of the guitar and a second outer slot configured to receive a fourth string of the guitar. An upper surface of the device may be configured to receive a truss rod cover of the guitar. The body may further define a first engaging hole at a first end of the body and a second engaging hole at a second end of the body, and each of the first and second engaging holes may be configured to receive a screw for securing the device to the headstock of the guitar.

In some cases, the device may be configured to adjust a downward break angle of the first and second strings.

Each of the first channel and the second channel of the device may comprise a first section on one side of the transition nut and a second section on the other side of the transition nut. The first section may define a first downward break plane at a first downward break angle, and the second section may define a second downward break plane at a second downward break angle. The first downward break angle may be different from the second downward break angle. In some embodiments, the second downward break angle of the device is larger than the first downward break angle.

In some cases, the device may be configured to adjust a lateral break angle of the first and second strings.

Each of the first channel and the second channel of the device may comprise a first section on one side of the transition nut and a second section on the other side of the transition nut. The first section may define a first lateral break plane at a first lateral break angle, and the second section may define a second lateral break plane at a second lateral break angle. The first lateral break angle may be different from the second lateral break angle. In some cases, the second lateral break angle of the device may be larger than the first lateral break angle.

In some embodiments, the first lateral break plane of the device is substantially the same as a plane defined by a pathway of the first and second guitar strings, respectively, between the bridge and the top nut of the guitar.

The device may, in some cases, be configured to adjust both a downward break angle of the first and second strings and a lateral break angle of the first and second strings.

In some cases, the first and second through holes of the transition nut of the device may be toroidal.

The first channel and the first outlet port of the body of the device may be configured to allow contactless passage of the first string through the body. Similarly, the second channel and the second outlet port of the body of the device may be configured to allow contactless passage of the second string through the body.

The device may, in some cases, be configured to provide access to a truss rod adjustor of the guitar in a partially secured configuration in which the first and second strings are received by the body.

In some embodiments, the body of the device may comprise wood. The transition nut of the device may comprise bone.

Embodiments of the present invention further provide a method of manufacturing a device for relieving the break angle on guitar strings. The method may comprise providing a body forming a first channel in the body between a first inlet opening and a first outlet port, wherein the first channel is configured to receive a first string of the guitar; and forming a second channel in the body between a second inlet opening and a second outlet port, wherein the second channel is configured to receive a second string of the guitar. The method may further include forming groove in the body proximate the first and second outlet ports substantially perpendicular to a longitudinal axis of the body and disposing a transition nut in the groove. The transition nut may define a first through hole configured to receive the first string and a second through hole configured to receive the second string. In an operational configuration in which the device is secured to the headstock of the guitar and the first string and the second string are received by the device, an angle of each of the first string and the second string is gradually adjusted between the neck of the guitar and a respective tuning peg In some embodiments, the step of disposing the transition nut in the groove may comprise using an adhesive to secure the transition nut within the groove.

BRIEF DESCRIPTION OF THE DRAWINGS

Having thus described the disclosure in general terms, reference will now be made to the accompanying drawings, which are not necessarily drawn to scale. The components illustrated in the figures may or may not be present in certain embodiments described herein. Some embodiments may include fewer (or more) components than those shown in the figures.

Figure 1:
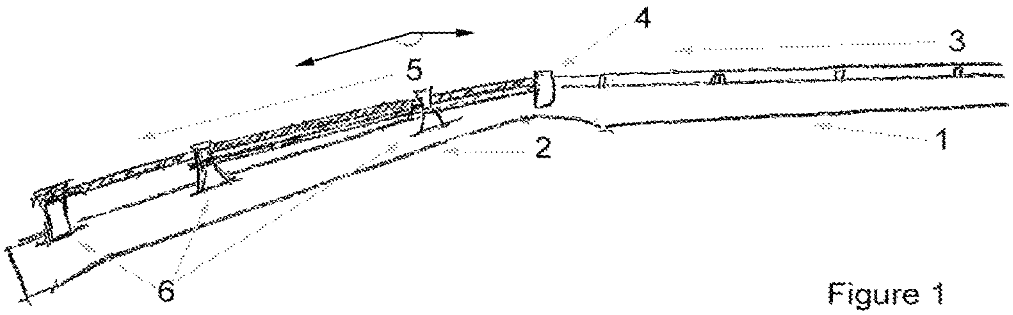
Figure 2:
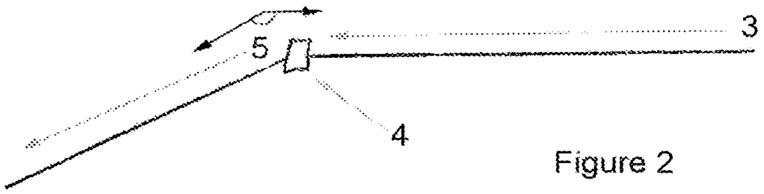
Figure 3:
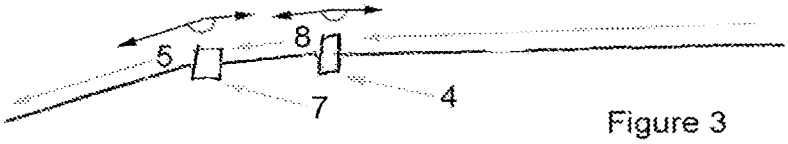
Figure 4:
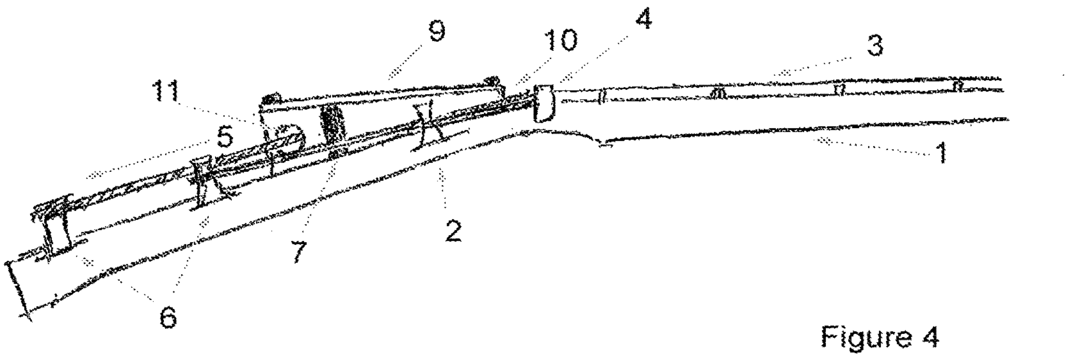
Figure 5:
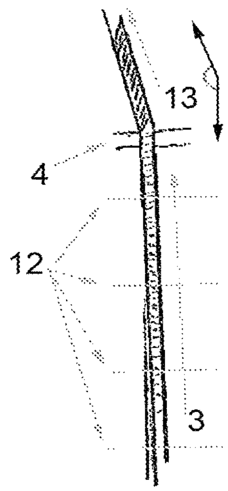
Figure 6:
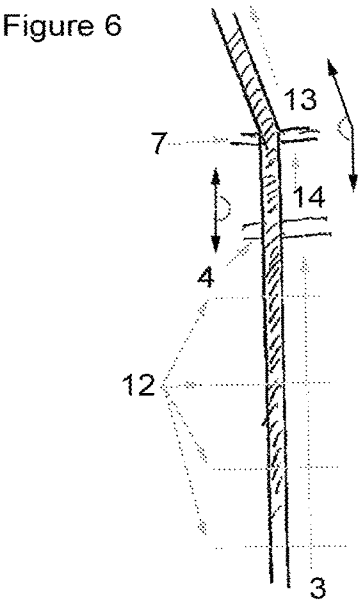
Figure 7:
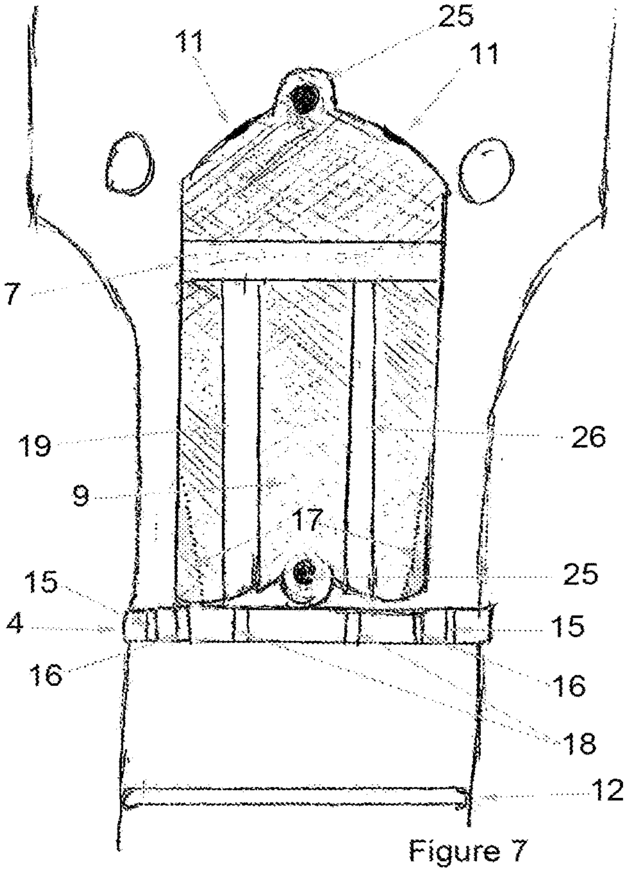
Figure 8:
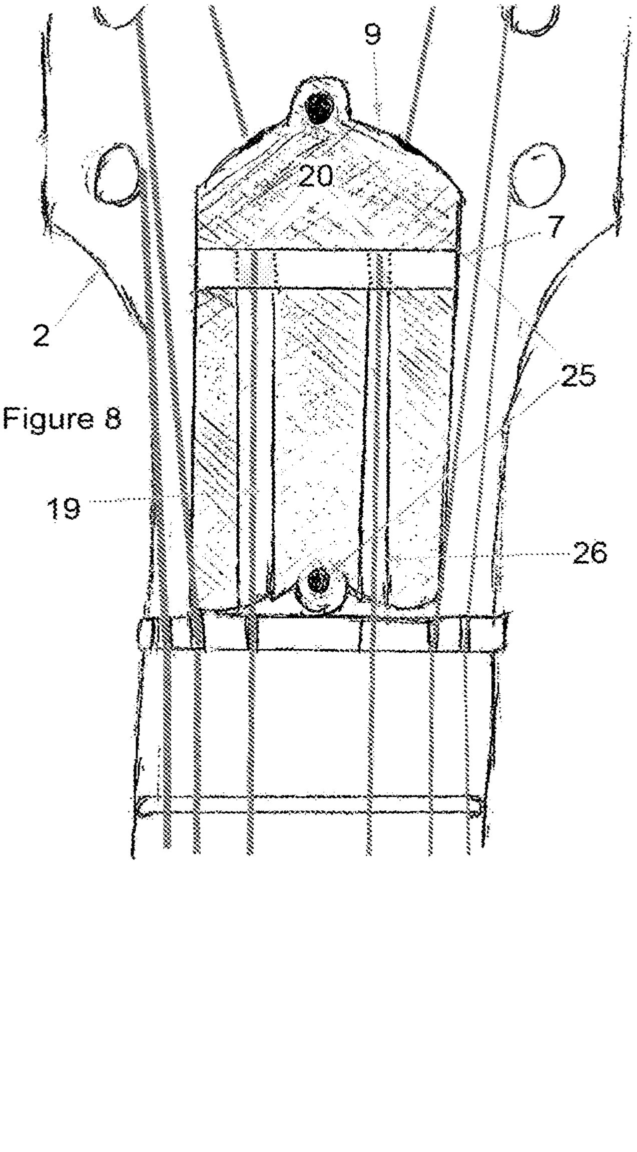
Figure 9:
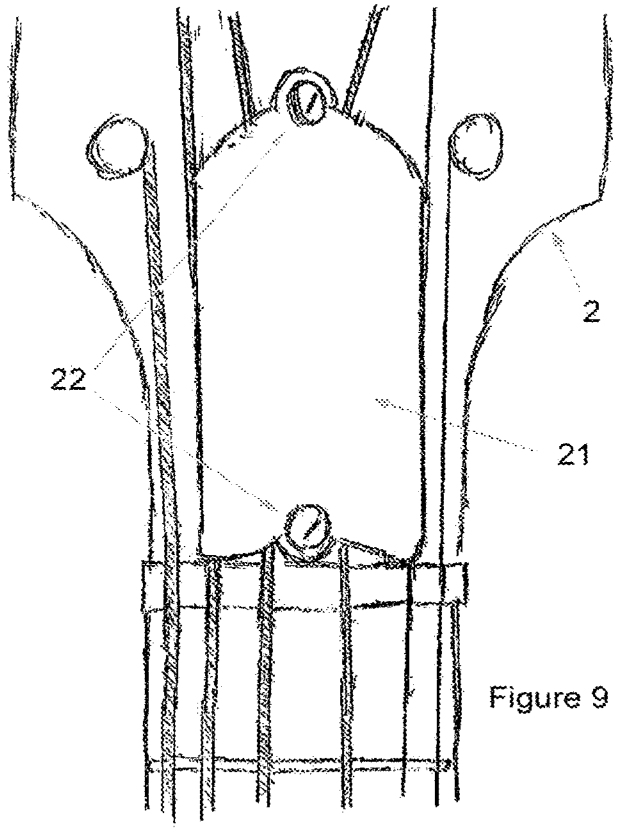
Figure 10:
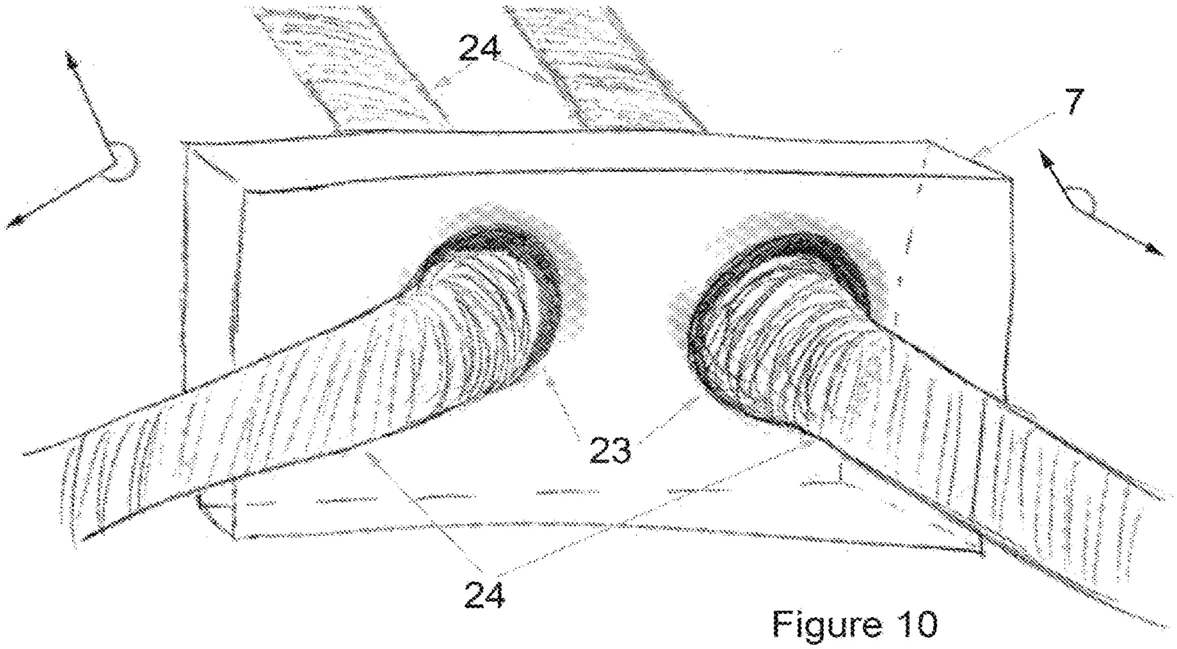

FIG. 1 illustrates a side view of part of the neck and headstock of a guitar without the device installed;

FIG. 2 illustrates a schematic representation of a side view of the downward break angle of a string without the device installed;

FIG. 3 illustrates a schematic representation of a side view of the downward break angle of a string with the device installed according to one or more embodiments of the present invention;

FIG. 4 illustrates a schematic representation a side view of part of the neck and headstock of a guitar with the device installed with of a side view of the downward break angle of a string with the device installed according to one or more embodiments of the present invention;

FIG. 5 illustrates a schematic representation of a top view of the lateral break angle of a string without the device installed;

FIG. 6 illustrates a schematic representation of a top view of the lateral break angle of a string with the device installed according to one or more embodiments of the present invention;

FIG. 7 illustrates a top view of part of the neck and headstock of a guitar with the device installed without the truss rod cover;

FIG. 8 illustrates a top view of part of the neck and headstock of a guitar with the device installed without the truss rod cover and with strings installed on the guitar to demonstrate the course of the strings as they travel through the device;

FIG. 9 illustrates a top view of part of the neck and headstock of a guitar with the device installed with the truss rod cover installed and with strings installed on the guitar to demonstrate the course of the strings as they travel through the device; and, FIG. 10 illustrates the end view of the transition nut, removed from the device, where the strings exit the device through toroidal holes to demonstrate the non-binding effect of the toroidal holes on the strings.

DETAILED DESCRIPTION

Example embodiments will now be described more fully hereinafter with reference to the accompanying drawings, in which some, but not all, embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "exemplary" and "example" as may be used herein are not provided to convey any qualitative assessment, but instead merely to convey an illustration of an example. As used herein, terms such as "front," "rear," "top," "bottom," "inside," "outside," "inner," "outer," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances. Thus, use of any such terms should not be taken to limit the spirit and scope of embodiments of the present invention.

As noted above, on many popular guitars, the angle of the headstock and the space between the center of the headstock and the tuning mechanisms causes the string to bind up in the slot at the top nut, which results in the string going out of tune. This is typical of guitars that have a wide headstock that is attached to the neck at a radical angle where the tuning mechanisms are placed on either side of the headstock (as opposed to all along one side).

Typically, this problem is most noticeable with the center strings (e.g., the D and G strings), where the deflection from the center of the neck to the side of the headstock is most acute. Combined with the radical angle of the headstock declining from the neck, and the diameter of the strings in the center of the neck, the center strings are most susceptible to binding and detuning.

In particular, the detuning happens when a string is bent by the player while playing the guitar. This causes greater tension on the string, which pulls more string through the top nut, from the headstock to the neck. Upon release of the string, the string should travel freely back through the top nut from the neck to the headstock, but due to the design of the guitar and the angles involved, it becomes bound up as explained above. This causes the string to be longer over the neck and thereby detuned.

With certain guitar brands, specifically guitars with a more or less rectangular headstock shape where the tuning machines are mounted in either side of the headstock (also known as a 3+3 design, as shown in FIG. 8), the angle of the headstock as it attaches to the neck and the space between the tuning machines based on the width of the headstock will cause a binding issue with the strings as they travel through the slots on the top nut of the guitar.

Because of the radical downward (FIG. 2) and lateral (FIG. 5) break angles, when a string is bent, especially the center strings, the string will bind in the top nut of the guitar and when the string is released, it stays bound in the top nut, causing the string to become detuned.

Accordingly, embodiments of the present invention provide a device that introduces a second "transition" nut after the first nut, to allow the string to travel through the slot at less radical angles. This happens because the transition nut changes the destination of the string after the top nut and the string travels on a flatter and straighter plane.

In particular, embodiment of the present invention provide a device that alleviates the break angles of one or more guitar strings by providing a staged change in the break angles, as described more fully below and in connection with the figures. Embodiments of the device include a body 5 (FIG. 1) and a transition nut 7 (FIG. 4). The body 9 (FIG. 8) defines a first channel 19 (FIG. 8) and a second channel 26 (FIG. 8). The first channel 19 (FIG. 8) extends between a first inlet opening 10 (FIG. 4) and a first outlet port 11 (FIG. 4) defined in the body, and the first channel 19 (FIG. 8) is configured to receive a first string of the guitar (e.g., a D string). Similarly, the second channel 26 (FIG. 8) extends between a second inlet opening 10 (FIG. 4) and a second outlet port 11 (FIG. 4) defined in the body 9 (FIG. 4), and the second channel 26 (FIG. 8) is configured to receive a second string of the guitar (e.g., a G string).

In some embodiments, the transition nut 7 (FIG. 8) is disposed proximate the first and second outlet ports 11 (FIG. 7) and is substantially perpendicular to a longitudinal axis of the body 9 (FIG. 7). The transition nut 7 (FIG. 10) may define a first through hole 23 (FIG. 10) configured to receive the first string 24 (FIG. 10) and a second through hole 23 (FIG. 10) configured to receive the second string 24 (FIG. 10). As such, in an operational configuration in which the device is secured to the headstock 2 (FIG. 4) of the guitar and the first string and the second string are received by the device, as shown in FIG. 10, an angle of each of the first string and the second string (e.g., the D and G strings) is gradually adjusted between the neck 1 (FIG. 1) of the guitar and a respective tuning peg 6 (FIG. 4) of the guitar.

The embodiments of this invention provide a device that alleviates the break angles of a guitar strings. The device includes a body 5 (FIG. 1) which is attached to the headstock 2 (FIG. 1) of the guitar, and a transition nut 7 (FIG. 4) inside the body of the device. In the body there are two channels 19 and 26 (FIG. 8) made to receive the center strings on certain guitars, typically the D and G strings.

The body is made so that it only affects those two strings. The other strings travel either outside the body or through channels 17 (FIG. 7) on the outside of the device. As the strings that are affected travel through the transition nut 7 (FIG. 7), the break angles are diminished, and in so doing the device keeps the strings from binding or otherwise detuning during play.

This is accomplished by the height of the transition nut 7 (FIG. 3) off the top of the headstock 2 (FIG. 4), causing the affected string to have a less extreme downward break angle 8 (FIG. 3) after the top nut 7 (FIG. 3), and by the holes in the transition nut 20 (FIG. 8) being centered on the headstock 2 (FIG. 8) so that the lateral break angle is lessened between the top nut 4 (FIG. 6) and the transition nut 7 (FIG. 6).

With reference to the figures, FIG. 1 illustrates a guitar without the device in place. The strings normally travels along a pathway 3 down the neck 1 across the top nut 4 and over the headstock 2 and then at a radical downward break angle 5 from the top nut 4 to the tuning machines 6.

FIG. 2 illustrates the path of the strings as they travel down the neck 3, over the top nut 4 and into a radical downward break angle 5.

FIG. 3 illustrates how the transition nut 7 will relieve the radical downward break angle 5 of the string after the top nut 4. With the device in place, the path of the string 3 travels down the neck 1 to the top nut 4. The string then travels at a less radical downward break angle 8 to the transition nut 7 and then at the original radical downward break angle 5 to the tuning machines.

FIG. 4 illustrates how the device 9 is mounted onto the headstock 2 according to embodiments of the present invention. The string travels down the neck 3, across the top nut 4, into the inlet opening 10, through the body of the device 9, through the transition nut 7, out through the outlet port 11, then following the original radical downward break angle 5, down the end of the headstock 2 and to the tuning machines 6.

FIG. 5 illustrates the normal path of the string traveling down the neck 3 and over the frets of the neck 12 (FIG. 6) and over the top nut 4. After the top nut 4, without the device in place, the string travels at a radical lateral break angle 13 to the tuning machines 6.

FIG. 6 illustrates the changes of the lateral break angle with the device in place. The strings follow the normal path down the neck 3, over the frets of the neck 12, and over the top nut 4. After the top nut 4 the strings that are affected by the device travel with no lateral break angle 14 over the transition nut 7 and then at a radical lateral angle 13 (similar to the original lateral break angle) and on to the tuning machines.

The main function of the device is to change the break angle of certain strings (typically the D and G strings) directly after they cross the top nut. With the device in place, the radical break angles are lessened because the string no longer travels directly from the top nut to the tuning machines. The downward break angle is stepped down, and the lateral break angle is alleviated.

FIG. 7 illustrates the downward-facing view of the open device 9 mounted on the headstock of a guitar without the truss rod cover attached, and demonstrates that the strings do not touch the body of the device except for where the two center strings (typically the D and G strings) strings pass through the opening of the transition nut 7. This obviates friction points on the device for those strings.

The strings travel over the frets 12 through the slots on the top nut 4. The top nut slots 15, for the top and bottom strings (typically the Low E and High E strings) align their strings so that they pass outside the footprint of the device 9. The top nut slots for the second and fifth strings (typically the A and B strings) 16 align their respective strings through notches 17 in the sides of the device 9. The top nut slots for the center strings (typically the D and G strings) 18 align their strings so that they travel down channels cut into the device 19 and 26. The strings travel through these channels 19 and 26 and into the transition nut 7.

In some embodiments only the center two strings that pass through the device 9 from the center slots 18 in the top nut 4 are to be affected by the device because typically these are the only strings that have the radical lateral break angle 13 (FIG. 6) combined with the radical downward break angle 5 (FIG. 3), a combination which causes the detuning problem that this device is designed to correct. This detuning problem occurs because these strings pass through their respective slots 18 in the top nut 4 the farthest from their respective tuning machines creating radical break angles and binding as a result.

FIG. 7 further illustrates holes 25 in the device 9 configured to receive screws 22 (FIG. 9). These holes 25 are aligned with the holes that were originally drilled into the headstock 2 (FIG. 9) for fastening the truss rod cover 21 (FIG. 9) in the original configuration of the guitar (without the device installed). By using longer screws that accommodate the thickness of the device 9 the screws 29 are modified to accommodate the thickness of the device 9 for engaging the truss rod cover.

FIG. 8 illustrates how the strings pass through or around the device 9 when it is attached to the headstock 2 without the truss rod cover attached. The transition nut 7 should be made from bone or the same types of material used in top nuts. There are holes in the transition nut 20 that the strings pass through.

FIG. 9 illustrates the top view of the device when it is attached to the headstock 2 with the truss rod cover 21 attached. The device will be fitted with screws 22 that fit into the original holes configured to receives screws which hold the truss rod cover in place. The screws that are made for the device will have the same diameter and thread pitch dimensions as the original screws but will be configured longer to accommodate the height of the device above the headstock.

The benefit of using the same screw ports and screws of the same diameter and pitch dimensions will be that the original headstock remains unchanged and is not damaged or devalued by the installation of the device.

FIG. 9 further illustrates that the device is unseen when viewed from the top and the truss rod over is attached because the device falls within the footprint of the truss rod cover. Accordingly, in some embodiments, the shape of the device generally remains obscured by the shape of the truss rod cover, such that when the guitar is being used the device is imperceptible as it is hidden by the original truss rod cover of the guitar. In other embodiments, the shape of the device is configured to be smaller than that of the truss rod cover so as to be hidden by the truss rod cover when the device is installed and the guitar is in use.

FIG. 10 illustrates that in some embodiments, in the transition nut 7 the holes may be toroidal in shape 23, at least for any surface of the transition nut 7 where the string touches it. This will obviate any binding at the transition nut because the string can move freely in an arc inside the toroid to find a point where it settles naturally. Because the hole is toroidal, the string cannot bind in the transition nut. Because the holes 23 in the transition nut 7 are configured to direct the strings in a straight line fashion toward the top nut 4 (FIG. 6), there is very little binding as the toroid takes pressure exerted on the strings 24 (FIG. 10) before it continues to the tuning machines. The strings then proceed out of the holes 23 and down the headstock at radical angles 5 (FIG. 3), 13 (FIG. 5).

The device can be removed easily and the original truss rod cover 21 (FIG. 9) is attached to its original position on the headstock 2 (FIG. 9) when the device is in place.

It is not necessary to remove any parts other than the truss rod cover 21 (FIG. 9) of the guitar to attach the device 9 (FIG. 8), alleviating the possibility of breaking or delaminating the finish of the guitar.

The truss rod can be adjusted while the device is in place, because the strings must be detuned for adjusting the truss rod and the device can easily slide forward on the headstock when the two center strings are loosened, thereby exposing the truss rod nut for adjustment Most headstocks have artwork or trademark designs on the headstock. The device will not obscure any of the original artwork or trademark designs on the headstock because it does not cover any more surface of the headstock 2 (FIG. 9) than the original truss rod cover 21 (FIG. 9).

The device 9 (FIG. 4) can be manufactured from wood or other material which allows for resonance from the string into the headstock.

The transition nut 7 (FIG. 4) can be manufactured from bone or other material similar to the material in the top nut.

The device is meant to relieve the downward break angle 5 (FIG. 2) and lateral break angle 13 (FIG. 5) on guitar strings due to the position of the tuning machines 6 (FIG. 1) on the headstock 2 (FIG. 1) relative the center slots 18 (FIG. 7) on the top nut 4 (FIG. 7) of most guitars.

The body has two channels 19 and 26 (FIG. 7) that receive the strings of the guitar into two inlet ports 10 (FIG. 4) aligned with the center slots 18 (FIG. 7) on the top nut 4 (FIG. 7) of most guitars. These are substantially perpendicular to a longitudinal axis of the neck 1 (FIG. 4) and headstock 2 (FIG. 4). The strings that are affected by the device do not touch the channels 19 and 26 (FIG. 8). The only point at which the strings touch the device are at the transition nut 7 (FIG. 8). The channels end in outlet ports 11 (FIG. 4) after the transition nut 4 (FIG. 4).

The transition nut 7 (FIG. 8) is perpendicular to the axis of the body of the device 9 (FIG. 8) and has two holes 20 (FIG. 8), toroidal in nature. The two strings 24 (FIG. 10) that are affected by the device pass through the holes 20 in the transition nut 7.

The device is secured to the headstock 2 (FIG. 9) of the guitar by screws 22 (FIG. 9) which are of the same diameter and pitch as the original screws, but which are longer, to accommodate the height of the device. The strings 24 (FIG. 10) that are affected by the device adjust downward break angle 5 (FIG. 2) and lateral break angle 13 (FIG. 5) between the neck of the guitar 1 (FIG. 4) at the top nut 4 (FIG. 4) and the tuning machines 6 (FIG. 4).

The device can be designed with more channels in the body and holes in the transition nut designed substantially similar to the device as described herein to accommodate other types of guitars with more than six strings which require such a device to alleviate detuning.

Embodiments of a method of manufacturing a device for relieving the break angle on guitar strings are also provided. According to some embodiments, the method comprises providing a body (such as the body 5 described above), forming a first channel and a second channel in the body, forming a groove in the body, and disposing a transition nut in the groove. For example, the first channel may be formed in the body between a first inlet opening and a first outlet port of the body, and the first channel may be configured to receive a first string of the guitar as described above. Similarly, the second channel may be formed in the body between a second inlet opening and a second outlet port of the body, and the second channel may be configured to receive a second string of the guitar as described above.

The groove may be formed in the body proximate the first and second outlet ports substantially perpendicular to a longitudinal axis of the body of the device, and the transition nut may be disposed in the groove. In some cases, the transition nut may be held in place within the groove via a friction fit, whereas in other cases an adhesive may be used to secure the transition nut within the groove. The transition nut may define a first through hole configured to receive the first string and a second through hole configured to receive the second string (e.g., the D and G strings). Thus, in an operational configuration in which the device is secured to the headstock of the guitar and the first string and the second string are received by the device, an angle of each of the first string and the second string may be gradually adjusted between the neck of the guitar and a respective tuning peg, as described above and in connection with the figures.

The invention claimed is:

1. A device for relieving the break angle on guitar strings, the device comprising:
- a body defining:
  - a first channel configured to receive a first string of the guitar, the first channel extending between a first inlet opening and a first outlet port; and
  - a second channel configured to receive a second string of the guitar, the second channel extending between a second inlet opening and a second outlet port; and
- a transition nut disposed proximate the first and second outlet ports, wherein the transition nut is substantially perpendicular to a longitudinal axis of the body, wherein the transition nut defines a first through hole configured to receive the first string and a second through hole configured to receive the second string, wherein, in an operational configuration in which the device is secured to the headstock of the guitar and the first string and the second string are received by the device, an angle of each of the first string and the second string is gradually adjusted between the neck of the guitar and a respective tuning peg.

2. The device of claim 1, wherein the body further defines a first outer slot configured to receive a third string of the guitar and a second outer slot configured to receive a fourth string of the guitar.

3. The device of claim 1, wherein an upper surface of the device is configured to receive a truss rod cover of the guitar.

4. The device of claim 1, wherein the body further defines a first engaging hole at a first end of the body and a second engaging hole at a second end of the body, wherein each of the first and second engaging holes is configured to receive a screw for securing the device to the headstock of the guitar.

5. The device of claim 1, wherein the device is configured to adjust a downward break angle of the first and second strings.

6. The device of claim 5, wherein each of the first channel and the second channel comprises a first section on one side of the transition nut and a second section on the other side of the transition nut, wherein the first section defines a first downward break plane at a first downward break angle, wherein the second section defines a second downward break plane at a second downward break angle, and wherein the first downward break angle is different from the second downward break angle.

7. The device of claim 6, wherein the second downward break angle is larger than the first downward break angle.

8. The device of claim 1, wherein the device is configured to adjust a lateral break angle of the first and second strings.

9. The device of claim 8, wherein the each of the first channel and the second channel comprises a first section on one side of the transition nut and a second section on the other side of the transition nut, wherein the first section defines a first lateral break plane at a first lateral break angle, wherein the second section defines a second lateral break plane at a second lateral break angle, and wherein the first lateral break angle is different from the second lateral break angle.

10. The device of claim 9, wherein the second lateral break angle is larger than the first lateral break angle.

11. The device of claim 9, wherein the first lateral break plane is substantially the same as a plane defined by a pathway of the first and second guitar strings, respectively between the bridge and the top nut of the guitar.

12. The device of claim 1, wherein the device is configured to adjust both a downward break angle of the first and second strings and a lateral break angle of the first and second strings.

13. The device of claim 1, wherein the first and second through holes of the transition nut are toroidal.

14. The device of claim 1, wherein the first channel and the first outlet port of the body are configured to allow contactless passage of the first string through the body.

15. The device of claim 1, wherein the second channel and the second outlet port of the body are configured to allow contactless passage of the second string through the body.

16. The device of claim 1, wherein the device is configured to provide access to a truss rod adjustor of the guitar in a partially secured configuration in which the first and second strings are received by the body.

17. The device of claim 1, wherein the body comprises wood.

18. The device of claim 1, wherein the transition nut comprises bone.

19. A method of manufacturing a device for relieving the break angle on guitar strings, the method comprising:

providing a body;

forming a first channel in the body between a first inlet opening and a first outlet port, wherein the first channel is configured to receive a first string of the guitar;

forming a second channel in the body between a second inlet opening and a second outlet port, wherein the second channel is configured to receive a second string of the guitar;

forming groove in the body proximate the first and second outlet ports substantially perpendicular to a longitudinal axis of the body; and disposing a transition nut in the groove, wherein the transition nut defines a first through hole configured to receive the first string and a second through hole configured to receive the second string, wherein, in an operational configuration in which the device is secured to the headstock of the guitar and the first string and the second string are received by the device, an angle of each of the first string and the second string is gradually adjusted between the neck of the guitar and a respective tuning peg.

20. The method of manufacturing the device of claim 19, wherein disposing the transition nut in the groove comprises using an adhesive to secure the transition nut within the groove.

* * * * *